May 26, 1959     S. B. JONES     2,888,569
RADIOACTIVE BORE HOLE LOGGING (BETA RAY DETECTOR)
Filed Jan. 5, 1955     3 Sheets-Sheet 1
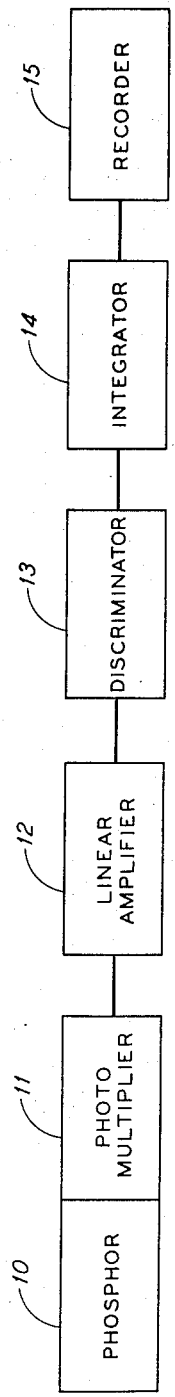
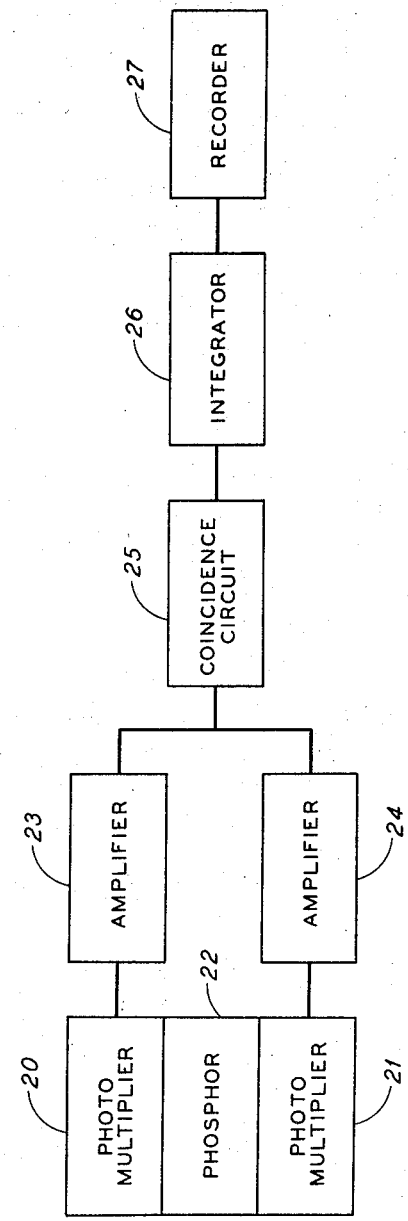
INVENTOR
STANLEY B. JONES
BY
ATTORNEYS

INVENTOR
STANLEY B. JONES

May 26, 1959

S. B. JONES 2,888,569

RADIOACTIVE BORE HOLE LOGGING (BETA RAY DETECTOR)

Filed Jan. 5, 1955

INVENTOR
STANLEY B. JONES

BY *A. L. Snow*
*Ralph L. Freeland Jr.*
ATTORNEYS

United States Patent Office 2,888,569
Patented May 26, 1959

2,888,569
RADIOACTIVE BORE HOLE LOGGING
(BETA RAY DETECTOR)

Stanley B. Jones, Whittier, Calif., assignor to California Research Corporation, San Francisco, Calif., a corporation of Delaware Application January 5, 1955, Serial No. 480,040

1 Claim. (Cl. 250—71)

This invention relates to radioactive bore hole logging, and more particularly relates to a method of and apparatus for detecting the beta-ray activity present in earth formations including fluids contained therein traversed by a well or bore hole, whether such activity is due to natural beta-ray radiations or to radiations artificially present in the formations either by bombardment thereof by a neutron source or by inflow of a beta-ray tracer fluid into the well bore.

It has been known that certain elements have a natural radioactivity wherein alpha particles, beta rays and gamma rays are emitted during radioactive disintegration of such elements to their decomposition products. Logs have been made to detect gamma rays given off by naturally radioactive particles. Likewise, neutron sources have been employed to induce artificial gamma radiation in formations traversed by a well bore. The amount of gamma radiation induced in the formations is in general proportional to the intensity of the neutron source. In order to produce such gamma radiation, it is necessary that a high-intensity neutron source be employed to bombard or irradiate the formations. Simultaneously with the production of gamma rays by bombardment of earth formations with a neutron source, beta rays have undoubtedly been produced by the nuclei of elements in the formation. However, it has not been possible to detect such beta activity in a well bore by previously known apparatus. Accordingly, it has long been desired to have a method and apparatus capable of detecting such beta-ray activity.

Various forms of beta-ray detectors have been successfully employed in experimental laboratory investigations. However, there has not been available apparatus capable of detecting such activity in a well bore. This is primarily due to the fact that beta rays are incapable of penetrating more than a few millimeters through metal such as aluminum or iron, and therefore such beta rays have been blocked from obtaining access to a conventional detector, such as an ionization chamber or a Geiger-Mueller tube by the thickness of the casing surrounding such detecting instruments.

It is therefore an object of the present invention to provide an appartus for detecting beta-ray activity in a well bore.

It is a further object of the present invention to provide well logging apparatus for detecting beta-ray activity whether such activity is naturally present in said well bore or artificially induced by a neutron source.

It is another object of this invention to provide a beta-ray detecting apparatus which may be positioned in a well bore so that beta-ray activity present in the bore hole due to nuclear emission may activate said detection apparatus and thereby identify the nature of the earth formations traversed by said well bore.

In general, the present invention is directed to a well logging apparatus for detecting beta-ray activity which comprises an elongated housing adapted to be positioned in a well bore, a beta-ray-responsive phosphor mounted to be visible externally of said housing, said phosphor having a beta-permeable coating adapted to cover the surface of said phosphor which is exposed to the well bore to protect said phosphor, and means for transmitting light quanta originating in said phosphor to the interior of said housing so that the photo-activity produced in said phosphor by beta rays may be detected at the earth's surface, thereby permitting said beta activity to be correlated with the location of said apparatus in said well bore.

In accordance with another aspect of the present invention, there is provided a method of detecting the arrival of a secondary recovery drive-fluid in a producing well from an injection well which includes introducing a small amount of a radioactive isotope, such as krypton 85, which emits only beta rays during decomposition, into the injection well, and then traversing the beta-ray-sensitive detector through the producing well to determine the location of the point therein where said drive fluid and said beta-ray-emitting tracer are entering the producing well. The present application is in part a continuation of my application Serial No. 231,920, filed June 16, 1951.

Further objects and advantages of the present invention will become apparent from the following detailed description taken in conjunction with the accompanying drawings which form an integral part of the present specification.

In the drawings:

Fig. 1 is a block diagram of one form of detecting apparatus and circuit which may be utilized in recording beta-ray activity in a well bore.

Fig. 2 is a block diagram of an alternative form of apparatus and circuit for detecting beta-ray activity in a well bore.

Figures 3, 4:
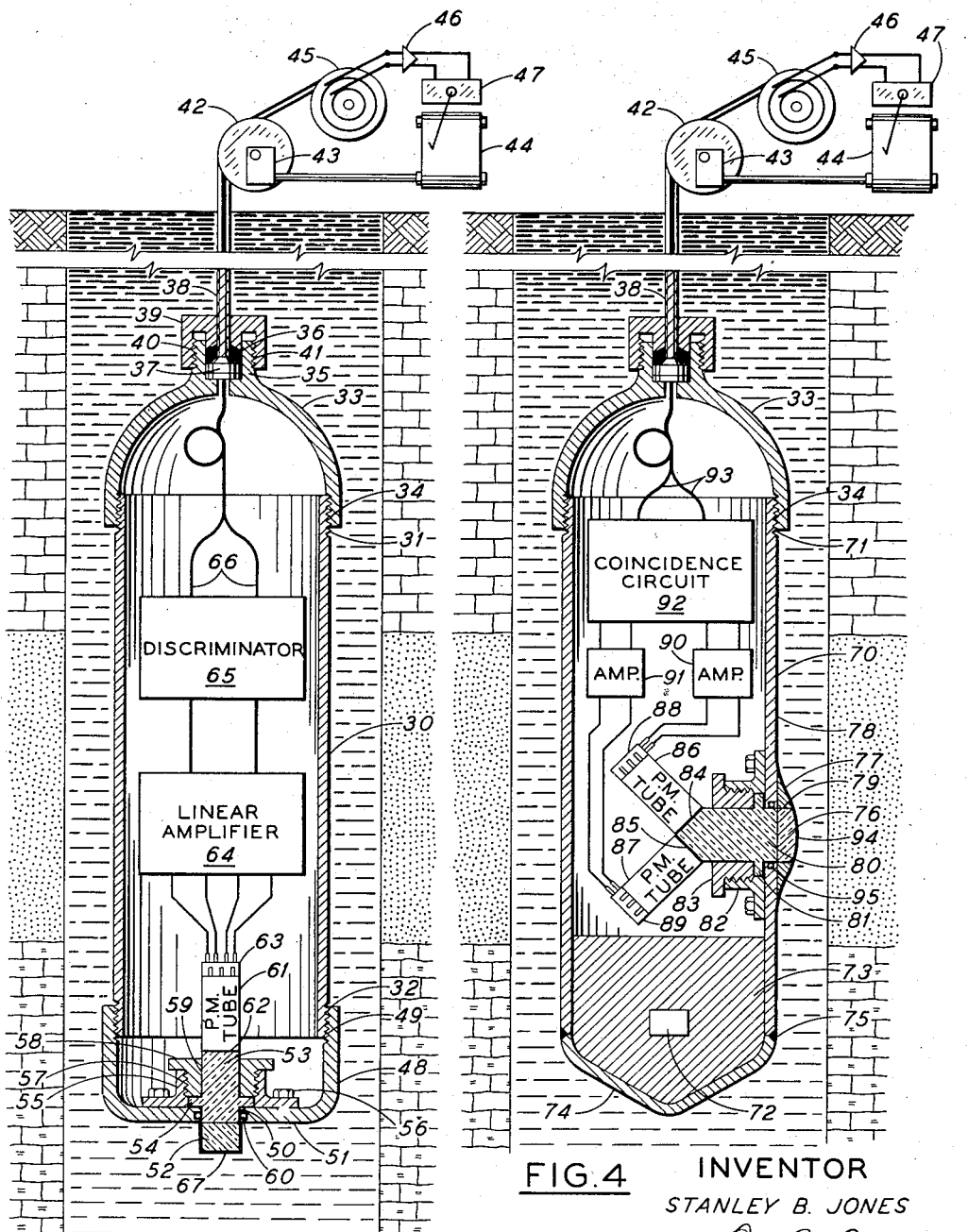
Fig. 3 is a longitudinal, sectional view of one form of apparatus which is particularly adapted to detect natural beta-ray activity in a well bore, utilizing the circuit shown in Fig. 1.
Figure 4 is a longitudinal, sectional view of an alternative arrangement particularly adapted for detecting artificially induced beta-ray activity and particularly illustrating the manner of employing the circuit shown in Fig. 2.

Referring now to the drawings, and in particular to Fig. 1, there is shown in block diagram form a detecting and recording system which may be utilized in detecting and recording beta-ray activity in a well bore. As there shown, a phosphor material, designated generally as 10, is provided as a beta-ray detector. Phosphor 10 may be constructed of any suitable scintillation material, for example, inorganic crystalline materials such as thallium-activated sodium iodide, thallium-activated potassium iodide, calcium tungstate or cadmium tungstate, or organic crystalline materials such as naphthalene, anthracene, silbene, terphenyl or dibenzyl or liquid phosphors such as terphenyl dissolved in toluene contained in a transparent holder. A photomultiplier tube 11 is preferably positioned adjacent phosphor 10 so that light quanta originating in the phosphor due to nuclear radiation impinging thereon may be detected by the photo cathode of multiplier tube 11. As particularly shown and described more fully hereinafter, a transparent window means, such as a quartz crystal or any other translucent material, may be interposed between phosphor 10 and photomultiplier 11 without substantial decrease in the efficiency of either phosphor 10 or photomultiplier tube 11.

The output of photomultiplier tube 11 is preferably connected to a linear amplifier, designated generally as 12. The output of amplifier 12 in turn is then connected through a discriminator circuit 13 to an integrator network 14 and finally to a recorder arrangement, designated as 15. Since the construction of each of the elements represented as blocks in Fig. 1 are well understood in the electronic art and in general constitute no part of the present invention, each of these elements has been schematically indicated.

Fig. 2 is a diagrammatic representation of an alternative form of scintillation counter circuit which may be used in place of the circuit illustrated in Fig. 1. For reasons well understood in the electronic art, it is frequently desirable to provide a coincidence circuit for detecting photoelectric impulses where high temperatures are likely to create sporadic, thermal emissions from the cathode of a photoelectric multiplier tube. To eliminate this thermal effect, there is shown in Fig. 2 a pair of photomultiplier tubes 20 and 21, both of which are positioned to detect light quanta originating in phosphor crystal 22. The amplified signal from photomultiplier tubes 20 and 21 are respectively transmitted to amplifiers 23 and 24, and the output signals from these amplifiers are applied to a coincidence circuit, designated generally as 25. The output of coincidence circuit 25 may then be detected and recorded through integrator 26 and recorder 27. As mentioned in connection with the description of Fig. 1, each of the elements shown as blocks in Fig. 2 are so well understood in the electronic art that further description of the circuits involved is considered unnecessary, since these circuits form no part of the present specification.

Referring now to Fig. 3, there is illustrated a preferred embodiment of the present invention particularly adapted to detect beta-ray activity naturally occurring or present in a bore hole due to the disintegration of radioactive elements, such as potassium-40, thorium, radium, uranium and the like. As there shown, an elongated cylindrical housing 30 is preferably provided with externally threaded sections 31 and 32 adjacent its outer ends. For the purpose of raising and lowering housing 30 and the apparatus associated and mounted therein through the bore hole, an upper end member 33 is preferably provided with mating threads 34 adapted to cooperate with threads 31 on the upper end of housing 30. The upper portion of end member 33 is in turn preferably provided with a threaded flange section 35 having a cable receiving bore 36 into which the expanded end 37 of a conventional, multiconductor well-logging cable 38 is adapted to fit. A cap member 39 having a threaded portion 40 adapted to mate with threads 41 on flange 35 provides a clamping arrangement for holding expanded end 37 of cable means 38 in bore 36.

Cable 38 may be raised and lowered by pulley member 42 which may be driven by any conventional means, such as an electric motor (not shown). The driving mechanism for pulley 42 likewise is adapted to operate a gear-reducing mechanism, designated generally as 43, which is arranged to drive a well logging chart mechanism 44. For the purpose of transmitting signals from the downhole apparatus to the surface recording means, a slip ring and brush assembly, designated generally as 45, may be connected to the conductor leads of logging cable 38. From slip ring arrangement 45, the detected signals may then be applied to amplifier 46 and signal recorder means 47.

For the purpose of detecting the presence of beta-ray activity in the well bore, a lower end member 48 is provided for housing 30 and secured thereto by means of screw threads 49 which engage threads 32 on housing 30. End member 48 is provided with a central bore in the substantially flat face portion 51 of end member 48. Opening or bore 50 is so arranged that a phosphor crystal, designated generally as 52, may be mounted upon a transparent member such as window means 53 which is preferably formed of quartz, glass or other materials having a high light transmission characteristic. For the purpose of obtaining maximum transmission of light impulses generated in crystal 52 through transparent means 53, crystal 52 is preferably sealed directly to the window or transparent member by Canada balsam or other material having an index of refraction similar to the material from which the transparent window means is constructed and crystal 51. In order to maintain boss 54 in contact with the inner face of end 51, a coupling flange 55 is adapted to be mounted directly against the inner face of end 51 and secured thereto by means of bolts 56. Flange 55 has an inner bore 57 adapted to receive boss 54 which is preferably provided with threads so that a retaining nut 58, which in turn is provided with threads may be screwed down against the upper surface of boss 54. As shown, retaining nut 58 is preferably provided with a bore 59 to permit transparent means 53 to extend into the interior of the housing 30. To prevent fluid under pressure within the well bore from entering the housing, seal 60 is preferably arranged to engage both the sides of a portion of window means 53 adjacent the outer edge of said window and bore 50 in end member 48.

For the purpose of detecting light quanta originating in phosphor crystal 52 and transmitted through window means 53, a photomultiplier tube 61 is preferably mounted so that photo-cathode face 62 of said tube mates directly with the inner end of window 53. Face 62 and window 53 are desirably affixed together in the same manner that crystal 52 is bonded to window 53. Photomultiplier tube 61 in turn is connected through a conventional tube mounting base 63 to a linear amplifier designated generally as 64 whose output in turn is connected to a discriminator indicated as 65. The output of discriminator 65 is then coupled through lead lines 66 to cable 38 and thence to the surface recording means comprising amplifier 46, recorder 47 and chart drive mechanism 44.

As contemplated in this embodiment, phosphor 52 may be of either rectangular or round transverse cross-section which, as shown, extends externally of the housing. However, to prevent abrasion of the crystal during logging operations in a well bore, the outer or exposed surface of the crystal which comes directly in contact with fluid in the well bore is provided with a coating 67 such as aluminum, of not greater than about 0.1 millimeter in thickness. Such a metallic skin may be fabricated from a sheet or deposited by evaporation or sputtering techniques in a manner well understood in the art of applying coatings of such thickness. While metals other than aluminum may be utilized for this coating, the toughness and resistance to abrasion of aluminum in an abrasive fluid such as that which is encountered in well bores has been found very satisfactory for this purpose. However, other coatings either metallic or non-metallic may be used to cover crystal 52.

Referring now to the alternative form of beta-ray detecting apparatus shown in Fig. 4, there is shown a downhole logging apparatus having a construction similar to that shown in Fig. 3. In particular, the equipment above upper end member 33 is similar in construction and arrangement to those units described in connection with Fig. 3. These units include cable 38 and the surface recording apparatus comprising pulley 42, slip ring 45, amplifier 46, recorder 47, as well as chart drive 44 and gear reducing member 43. Similar numbers are used in Fig. 4 to designate comparable elements to those shown in Fig. 3.

However, in the present embodiment, the elongated cylindrical housing member is designated as 70 and is preferably provided with threads 71 adjacent the upper end thereof which are adapted to mate with threads 34 on upper end member 33. In the present arrangement, the lower end of housing 70 is preferably arranged to provide a mounting for a neutron source 72 which is preferably encased in a lead block 73 poured into the lower end of housing 70 which has been closed by an end member 74 welded or otherwise attached to the lower end of housing 70. For convenience of construction, end member 74 and the lower end of housing 70 may be secured together by weld bead 75.

Since in the present embodiment means are provided by neutron source 72 for bombarding the earth formations traversed by the well bore, it is desirable to mount the scintillation crystal 76 along the side wall of housing 70. With this arrangement, crystal 76 must be protected from abrasion along the side wall of the bore hole and to so protect the crystal a sloping shoulder member 77 is provided immediately adjacent the sides of crystal 76. This shoulder member 77 may be formed as a mound or ridge on the outside of wall 78 and then a bore 79 passed directly through mound 77 and wall 78. For a purpose similar to that described in connection with the embodiment in Fig. 3, a transparent window means 80 is adapted to have one end pass through bore 79 and provide a direct mounting face for crystal 76. Crystal 76 may be secured to window 80 in the same manner described in connection with Fig. 3. Transparent window 80 is preferably provided with an enlarged diameter or boss 81 adapted to mate with the inner surface of wall 78 and is held directly thereagainst by an arrangement similar to that shown in Fig. 3 comprising flange 82 mounted on wall 78 and nut 83 which bears directly against boss 81.

As distinguished from the previously described embodiment, window means 80 is preferably provided with a pair of faces 84 and 85 which are at substantially right angles to each other and approximately 45 degrees to the longitudinal axis of transparent means 80. Photomultiplier tubes 86 and 87 are arranged to have their photocathode faces mate with faces 84 and 85, respectively, and provide an arrangement for detecting coincidentally a single, radiation-activated light impulse originating in phosphor 76. Tubes 86 and 87 are provided with mounting bases 88 and 89, respectively, each of which provides interconnection to amplifiers 90 and 91, respectively. The output of amplifiers 90 and 91 are both connected to a coincidence circuit, designated generally as 92, whose output is connected through lines 93 to the conductors of cable 38.

In the embodiment shown in Fig. 4, only the outer surface of crystal 76 need be provided with the beta-ray transparent coating 94 of less than about 0.1 mm. This surface covering 94 is provided for the same purpose as described in connection with Fig. 3. To insure that the interior of housing 70 is not invaded by well fluid, a pressure seal 95 may be provided between bore 79 and window 80.

In operation, it will be apparent that during well logging runs the bore hole may be traversed by raising and lowering either housing 30 of Fig. 3 or housing 70 of Fig. 4. Each run is performed by driving pulley 42, which, through cable means 38, is adapted to raise or lower the housings 30 or 70.

With special consideration of the operation of the embodiment shown in Fig. 3, it will be apparent, as mentioned hereinbefore, that this embodiment is particularly adapted to detect natural beta-ray activity in a bore hole. This is possible by virtue of the fact that with crystal 52 mounted exteriorly of housing 30, beta-ray activity is capable of penetrating the thin shell or coating 67 surrounding the phosphor. Such rays will successfully penetrate a metal thickness of a few millimeters, but to insure a high percentage of penetration, the thickness as contemplated in the present invention should be about 0.1 mm., and the preferred thickness range is not greater than about 1.0 mm. While gamma ray activity may be present simultaneously with beta-ray activity in a bore hole, either form of nuclear activity may pass through coating 67 and thereby activate photo-emitting material of phosphor 52 to emit light quanta therefrom. However, in general it has been found that gamma rays naturally present in a well bore have well-defined energy values. Accordingly, by proper adjustment of the discriminator circuit, the electrical pulses originating in the phosphor due to interaction thereof with higher energy natural detection of gamma rays may be excluded to emphasize the beta rays. This may be accomplished by adjusting the discriminator to reject electrical pulses corresponding to the energy of the unwanted interactions causing photons to be emitted by the phosphor.

Upon absorption of beta rays by crystal 52, said crystal emits photons or light quanta corresponding in total intensity to the energy of the ray absorbed therein. These light quanta are directly transmitted with only slight degradation of signal strength through transparent window means 53 and face 62 to the photocathode of photomultiplier tube 61. As is well understood in the electronic art, photomultiplier tube 61 is capable of amplifying such photo impulses by approximately $10^6$ to produce an electrical pulse corresponding in magnitude to the total intensity of light. Accordingly, a very few number of light quanta activated in crystal 52 by beta activity are capable of producing a detectable and recordable electrical signal.

Figure 5:
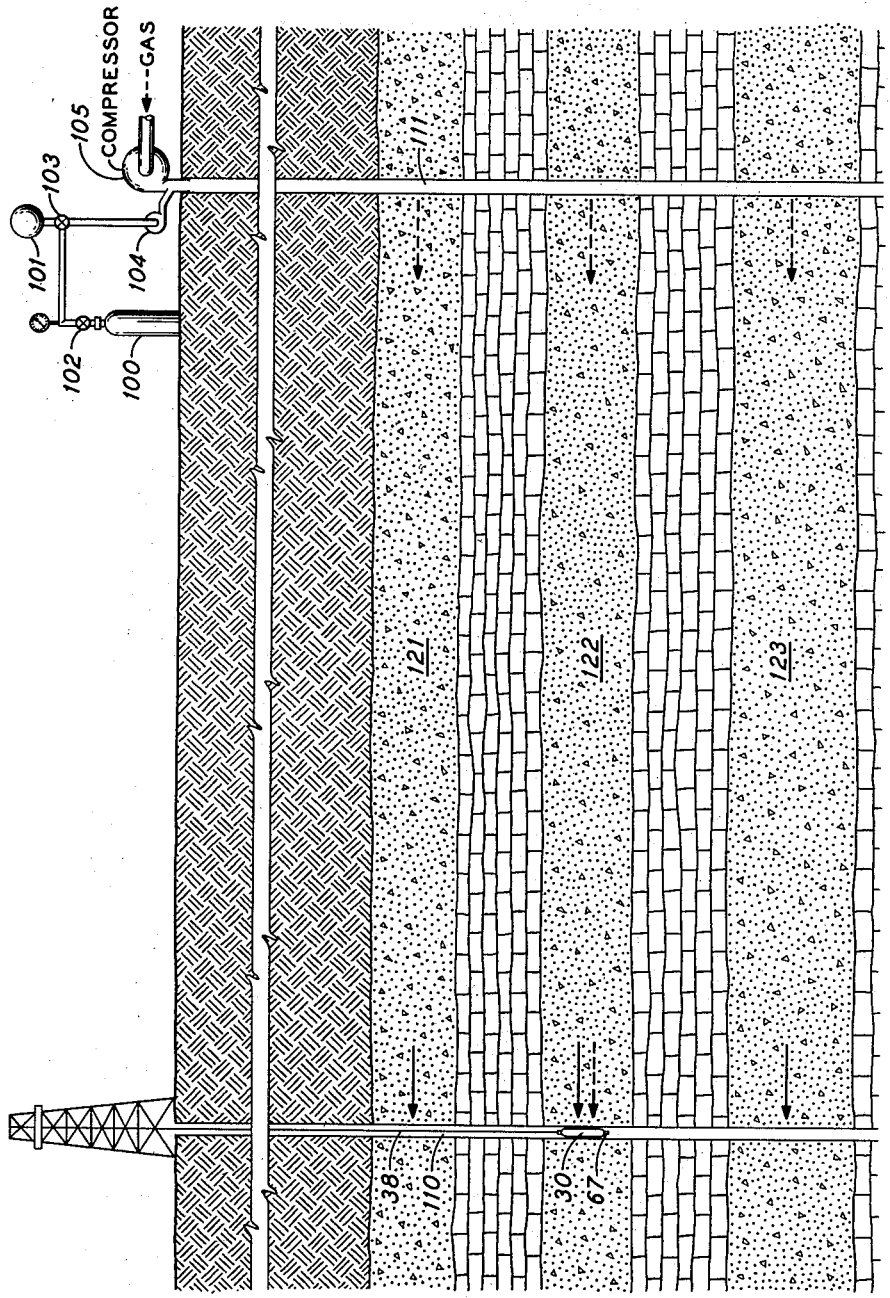
Fig. 5 is a schematic representation of a secondary recovery system utilizing the method of detecting arrival of the secondary recovery drive fluid, including a beta-ray-emitting tracer, injected at one well, so that the formation where said drive fluid is breaking through into the producing well may be located in the producing well.

In addition to the utilization of the embodiment shown in Fig. 3 for detecting natural nuclear activity in a well bore, it is possible, as illustrated schematically in Fig. 5, to detect the arrival of a tracer gas injected with petroleum fluids, whether liquid or gas, where such fluids are introduced as the driving medium to increase the total amount of useful fluids recoverable from the well. This process is practiced in either secondary recovery, or pressure maintenance programs.

One of the problems frequently encountered in the use of a secondary recovery drive fluid, such as water or hydrocarbon gas, is encountered due to break-through of the drive fluid into the producing wells from one of a plurality of producing zones, such as those illustrated schematically in Fig. 5. As there seen, several horizons or producing zones, identified as 121, 122 and 123, each containing petroleum fluids, are simultaneously flooded from the reservoir rock by a drive fluid, such as gas, which is introduced into injection well 111 by compressor 105. A similar injection technique is employed where the drive fluid is a liquid, such as water, with the exception that a pump is used as the drive means. Since the zones 121, 122, and 123 vary in porosity, permeability and other flow characteristics, it is often found that one of the zones will offer much less resistance to flow than the other zones. Under these conditions, break-through of the flooding or drive fluid will occur between "flood" well 111 and producing well 110. This break-through may cause the other zones to cease producing and also introduce the drive fluid into the fluid production. The location of the zone wherein "break-through" has occurred, so that that zone may be isolated by cementing or plugging, may be determined in accordance with the present invention by the inclusion of a small amount of a radioactive tracer material in the drive fluid.

In accordance with a preferred embodiment of the present invention, the radioactive tracer material may be krypton 85 which has a relatively long half life and emits beta rays of 0.7 m.e.v. Since krypton is a noble gas and inert to reaction with either the materials of the formations or the hydrocarbon liquids in the well bores or the producing zones, this material may be injected into the secondary recovery drive fluid supplied to well 111 and compressor 105 by the arrangement illustrated in Fig. 5. As there shown, the tracer gas, properly shielded, is supplied from gas cylinder 101 into a charging section between valves 102 and 103. The section of piping between these valves, together with the pressure gauge, provides a predeterminable charge of the radio-active tracer fluid which is then introduced into the injection well by compressor 104 after valve 103 has been opened to permit the charge to be drawn into the well. A purging gas cylinder 100 is provided for sweeping all of the radioactive material from the piping between valves 102 and 103. Accordingly, it will be seen that with the radioactive tracer of the beta-ray-emitting type introduced with the secondary recovery drive fluid, whether liquid or gas, it is possible to detect the zone from which said material is arriving in the producing well 110 by traversing the well with a beta-ray sensing apparatus designated as logging sonde 30, including a beta-sensitive crystal 67. By proper discrimination of the energies of the radioactive rays detected by crystal 67 and photomultiplier tube 61 operating through window 53 (as shown in Fig. 3), it is possible to determine with great accuracy the horizon wherein the radioactive krypton 85 is entering the producing well.

The embodiment shown in Fig. 4, as mentioned above, may be raised and lowered in the well bore in much the same manner as that disclosed in Fig. 3. However, in the particular arrangement of Fig. 4, means are provided by neutron source 72 for artificially bombarding the earth formations or material assimilated into the drilling fluid from the earth formation, traversed by the well bore. While in general it has been known that such neutron sources are capable of producing gamma ray energy from such formations, it has not heretofore been possible to detect the beta-ray activity resulting from such artificial bombardment. Since in general the heavier elements produce beta-ray activity as readily as gamma ray energy, study and determination of the nature and content of the earth formations has been possible for only a portion of the energy actually available. However, by virtue of the present arrangement, wherein the phosphor crystal 76 having a metal skin 94 is arranged to be positioned directly in the well bore, beta rays may be directly detected by causing the emission of light quanta from the phosphor crystal 76.

As distinguished from the embodiment in Fig. 3, provision is made in Fig. 4 for detecting simultaneously in photomultiplier tubes 86 and 87 the light quanta transmitted through transparent window means 80. As mentioned above, the faces or surfaces 84 and 85 against which the faces of the photomultiplier tubes are positioned are preferably arranged with an included angle of 90 degrees therebetween. By this arrangement, substantially all of the light pulses originating in crystal 76 which are transmitted through window means 80 actuate both photomultiplier tubes 86 and 87.

As mentioned above, it is desirable in certain cases, especially where the downhole temperature in very high, to provide a pair of photomultiplier tubes operating through a coincidence circuit such as that designated as 92 to prevent sporadic, thermal emissions from the cathode of the photo-tube from being amplified as a signal originating in the phosphor crystal 76 and due to radioactivity in the bore hole. Since the construction of a coincidence circuit arranged to detect the coincidence of light impulses received by two photomultiplier tubes is well known in the electronic art, it is believed that no further explanation of this circuit is necessary.

From the foregoing detailed description of the construction and operation of beta-ray detecting apparatus, it is apparent that by virtue of the present invention a method and apparatus has been provided for detecting beta-ray activity in a well bore. Likewise, it will be apparent that by virtue of the present invention a method and apparatus has been provided for detecting beta-ray activity in the earth formations traversed by a well bore, whether such activity is naturally present or artificially induced.

While various modifications and changes in the apparatus described will occur to those skilled in the art, all such modifications and changes which fall within the scope of the appended claims are intended to be embraced thereby.

I claim:

The method of identifying one of a plurality of fluid producing horizons in a producing well bore where secondary recovery or pressure maintenance drive fluid is entering said well bore which comprises the steps of introducing a small amount of beta-ray-emitting radioactive krypton 85 into the secondary recovery or pressure maintenance drive fluid, injecting said drive fluid containing said beta-ray-emitting radioactive krypton 85 into an injection well intersecting said plurality of fluid producing horizons, positioning a beta-ray-sensitive scintillation detector in the producing well, detecting only the radioactivity interactions with said detector having energies substantially less than 0.7 m.e.v. traversing said producing well with said detector to locate the horizon of said plurality having the greatest radio-activity less than about 0.7 m.e.v. within said well and identifying the depth of said producing horizon by measuring the total radiation under about 0.7 m.e.v. in a single round trip of said detector through said well bore where said drive fluid containing said beta-ray-emitting radioactive krypton 85 has entered.

References Cited in the file of this patent

UNITED STATES PATENTS

| 2,429,577 | French | Oct. 21, 1947 |
|---|---|---|
| 2,711,482 | Goodman | June 21, 1955 |
| 2,712,081 | Fearon et al. | June 28, 1955 |
| 2,721,944 | Ruble | Oct. 25, 1955 |